United States Patent [19]

Messer

[11] 4,255,783
[45] Mar. 10, 1981

[54] SELECTIVE COMMUTATION CIRCUIT FOR AN INVERTER

[75] Inventor: Gordon J. Messer, Tolland, Conn.

[73] Assignee: United Technologies Corporation, Hartford, Conn.

[21] Appl. No.: 43,915

[22] Filed: May 30, 1979

[51] Int. Cl.³ .......................................... H02M 7/515
[52] U.S. Cl. ...................................... 363/96; 363/136
[58] Field of Search ......................... 363/96, 135–139

[56] References Cited

U.S. PATENT DOCUMENTS

| 3,249,844 | 5/1966 | Jensen | 363/139 |
| 4,180,853 | 12/1979 | Scorso, Jr. et al. | 363/96 |

Primary Examiner—William M. Shoop
Attorney, Agent, or Firm—Richard P. Lange

[57] ABSTRACT

The commutation circuit of an inverter is actuated only when the main thyristors cannot be transitioned to the nonconducting state by the removal of the gate signal. If a commutation pulse is required, the commutation capacitors are charged to the appropriate voltage level immediately prior to the switching point so that they may provide a sufficient pulse of current to extinguish the current through the thyristor. The commutation capacitors are then returned to a stable voltage level until another commutation pulse is required.

7 Claims, 2 Drawing Figures

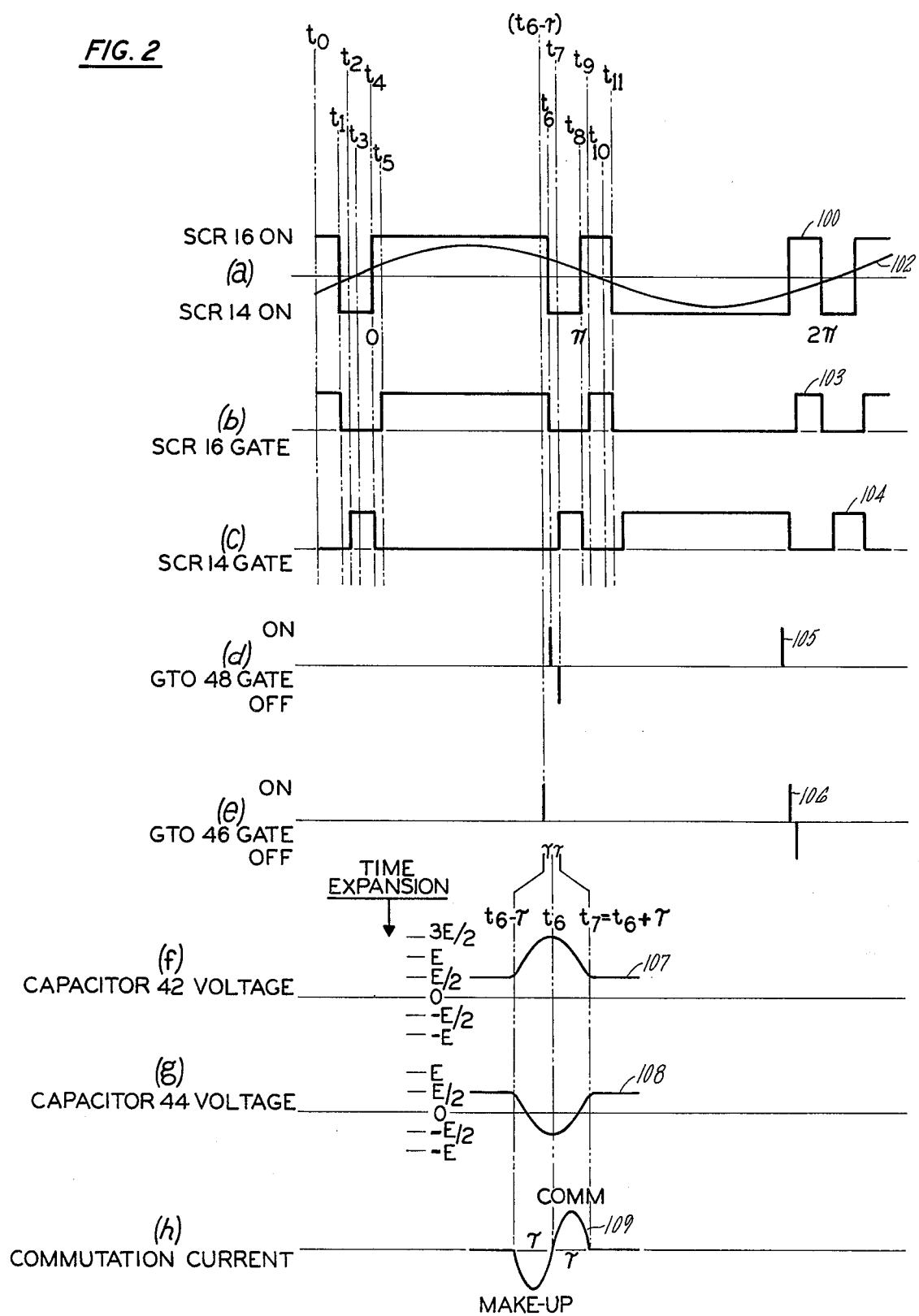

SELECTIVE COMMUTATION CIRCUIT FOR AN INVERTER

BACKGROUND OF THE INVENTION

1. Field of the Invention

This invention relates to inverters, and more particularly, to the selective actuation of a commutation circuit in a self-commutated inverter by inhibiting the operation of the commutation circuit when the main thyristors will transition to the blocked state because of the voltage-current phase relationship of the load, and the switching or modulation pattern of the inverter.

2. Description of the Prior Art

Inverters are known generally and are devices which transform DC (direct current) electrical energy, such as from a fuel cell or the like, into AC (alternating current) electrical energy suitable for use by utility companies or other consumers of electrical energy. Most inverters include at least one pair of main switching elements, and by alternatively actuating each switching element, electrical energy from the DC source flows through the load first in one direction and then in the reverse direction forming a fundamental AC waveform.

Numerous different types of switching devices can be employed in an inverter as a switching element to connect the positive and negative input buses to the load. Semiconductor switches, such as thyristors, are frequently used in present day inverters and this type of device is substantially unidirectional so that the high energy current pulses pass therethrough in only one direction when the switch is turned on by a gate signal. Some semiconductor switches, particularly those capable of handling large currents such as thyristors, will not immediately change from a conducting state to a nonconducting state upon the removal of the gate signal, but require that the instantaneous current passing therethrough be reduced to near zero, sometimes in conjunction with a reverse bias, to allow the thyristors to transition to its off state. The process by which the current is reduced to zero is known as "commutation" and numerous circuit configurations which store energy and then release it have been proposed for this function. Many commutation circuits operate by displacing the current in the solid state switch from a storage device, such as a capacitor or resonant circuit, for a time period greater than the turn off time of the semiconductor switch. During this period the load current is being supplied by the storage device, and the magnitude of the current through the thyristor drops to zero for a sufficient time period to allow the transition of the thyristor to the nonconducting state.

In inverters generally, it has been recognized that it is desirable to make the transformation between DC electrical energy and AC electrical energy as efficiently as possible for the well recognized reasons of energy consumption, cost saving, etc. One method of improving inverter efficiency is to accurately match the size of the commutation current pulse to the instantaneous value of the current to be extinguished. It is known that the required size of a commutation pulse varies directly with the magnitude of the load current, and that one efficiency improving technique is to decrease the energy stored in the commutation circuit per cycle as a function of load.

One efficiency improving variation is disclosed in U.S. patent application Ser. No. 973,339 by J. R. Vivirito filed on Dec. 26, 1978 for AUXILIARY COMMUTATION CIRCUIT FOR AN INVERTER, assigned to the same assignee as the present invention. The disclosed apparatus includes an auxiliary commutation circuit of the impulse commutated bridge inverter type in which additional commutation energy is stored on a pair of oppositely charged capacitors. Rather than operating on every cycle, switches in series with the charged capacitors are operable only in response to a sensed overcurrent condition to provide the additional stored energy for commutation.

Still another energy saving variation of interest is disclosed in U.S. patent application Ser. No. 972,543 to G. J. Messer filed on Dec. 22, 1978 for CONTROL FOR AN AUXILIARY COMMUTATION CIRCUIT, also assigned to the same assignee as the present invention. A control circuit used with an auxiliary commutation circuit of an inverter which responds to the increased time period resulting from the additional capacitance and extends the initiation of the make up pulse. This allows a natural decay of the commutation pulse so that the make up pulse begins when the instantaneous value of the current through the thyristor is low.

Yet another efficiency improving technique is disclosed in U.S. Pat. No. 3,391,328 issued July 2, 1968 to B. Mokrytzki for INCREASED EFFICIENCY COMMUTATION CIRCUIT FOR THYRISTORS. In that patent a commutation current is limited in magnitude to that which approaches the level required for safe commutation thereby minimizing wasted current and increasing efficiency.

All of the heretofore identified disclosures utilize a commutation circuit which is rendered operative on a per cycle basis to essentially extinguish the load current through the thyristor being commutated, whether or not a commutation current is actually required. Accordingly, each time the commutation circuit is triggered, some of the energy from the source is consumed by storing and discharging a part of this energy within the inverter, a process which decreases inverter efficiency.

SUMMARY OF THE INVENTION

It is an object of the present invention to provide a commutation circuit for an inverter which operates more efficiently over the entire load range by inhibiting the commutation circuit when the main thyristors can be transitioned to the nonconducting state solely by removing its gate signal.

According to the present invention, a pair of commutation capacitors are maintained at a stable voltage level of E in/2 until it has been determined that unassisted switching of the main thyristors cannot occur. At that time the commutation capacitors are charged to a voltage level with a polarity that is suitable for extinguishing the current in the main thyristors. The commutation capacitors are then returned to the stable E in/2 voltage level until it is determined that another commutation pulse is required.

According to a feature of the present invention, the normal order of the commutation make up pulse is reversed so that the make up pulse occurs immediately prior to a commutation pulse resulting in the commutation capacitors being fully charged only when required for providing a pulse of current to the load during the main thyristor turn off time.

Other objects, features and advantages of the present invention will become apparent in the light of the following detailed description of a preferred embodiment as illustrated in the accompanying drawings.

BRIEF DESCRIPTION OF THE DRAWING

FIG. 2 is a graphic illustration of the waveforms versus time at various points in the embodiment illustrated in FIG. 1.

DETAILED DESCRIPTION OF THE ILLUSTRATED EMBODIMENT

Figure 1:
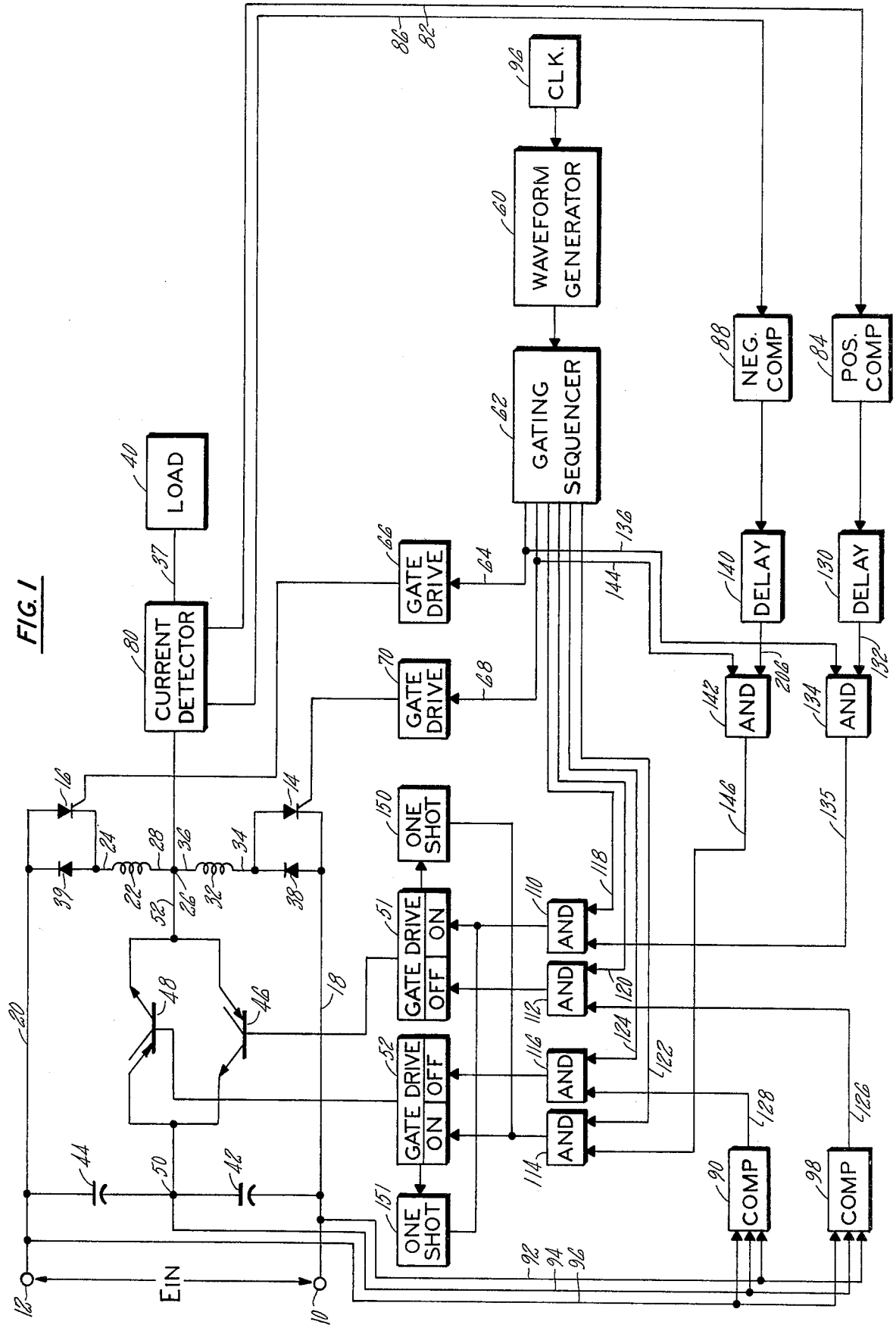
FIG. 1 is a block diagram illustrating one embodiment of the present invention including a control circuit therefor.

Referring initially to FIG. 1, one embodiment according to the present invention is illustrated in which a typical DC-to-AC power inverter is used to transform DC electrical energy into AC electrical energy for use by a power utility, or other electrical power consumer. As shown, a power inverter includes a negative bus 10 and a positive bus 12 which receive DC electrical energy from an external source (not shown) such as a fuel cell or the like. While the drawing depicts a single half-bridge connected across the negative and positive buses, it should be understood that any number of half-bridges could be used, and multiphase AC output power can be formed from a plurality of properly phased half-bridges. A pair of main semiconductor switches, such as a thyristor 14 and a thyristor 16, are connected by leads 18 and 20, respectively, to the negative input bus 10 and the positive input bus 12, to switch the DC electrical energy from the source. An inductor 22 is connected by a lead 24 to the cathode side of the thyristor 16 while the other side of the inductor 22 is connected to an output node 26 by a line 28. In a similar manner, an inductor 32 is connected by a lead 34 to the anode side of the thyristor 14 while the other side of the inductor 32 is connected by a lead 36 to the output node 26. A lead 37 is connected to the output node 26 and provides an output pathway for the current to a load 40. A diode 38 and a diode 39 shunt the thyristors 14 and 16, respectively, to provide a pathway for current through the inverter to the input buses in a reverse direction from that provided by the unidirectional thyristors.

As briefly mentioned hereinbefore, a particular feature of the present invention is that the commutation circuit for the main thyristors need not be either charged or actuated every time the main thyristors are to be turned off thereby improving inverter efficiency. As is well known, many semiconductor switches, particularly those with a high current capability, change from their nonconducting state to their conducting state almost instantaneously in response to a suitable signal applied to their gate terminal. However, in order to change a typical power thyristor from its conducting state to its nonconducting state, the current in the anode-to-cathode path must be reduced to zero for a predetermined time, known as the turn off time, before the thyristor can transition to its nonconducting state. A commutation circuit can be used to store sufficient energy on a per cycle basis to provide a pulse of current to the load in place of that through the semiconductor switches thereby allowing them to transition to the nonconducting state. However, each time that the commutation circuit is actuated to provide this commutation pulse and then recharged for the next actuation, electrical energy is consumed thus reducing overall inverter efficiency.

Referring still to FIG. 1, the commutation circuit employed in the present invention includes a commutation capacitor 42 and a commutation capacitor 44, these capacitors being coupled between the negative input bus 10 and the positive input bus 12 so that the source voltage E in is divided equally thereacross. A pair of thyristors, such as a GTO 46 and a GTO 48, are coupled in a back-to-back configuration and are connected from between the pair of commutation capacitors at node 50 to the output node 26 by a line 52. The GTOs 46 and 48 are a particular type of thyristor which have the capability of changing from the conducting state to the nonconducting state thereby blocking a forward flowing current by merely supplying a suitable pulse to its appropriate terminals but generally do not have as high a current rating as the main thyristors. These thyristors are known and are marketed under such names as "gate turn-off switches" or "latching transistors" and are available through various discrete component manufacturers including General Electric Company and Westinghouse Electric Corporation. A gate drive 51 and a gate drive 52 are connected to the control terminals of GTOs 46 and 48, respectively, to provide a suitable gate signal for transitioning the switches between the nonconducting and conducting states.

An important feature of the present invention is that the normal order of the commutation pulse and make up pulse is reversed so that the make up pulse on each switching cycle occurs immediately prior to the commutation pulses. This means that the commutation capacitors are not charged for commutation until it has been determined that a commutation pulse will be required. During this process one of the two capacitors, depending on which of the main thyristors is in the conducting state, is charged to a voltage level of approximately 3E in/2 and the other capacitor to a negative E in/2 potential, to store sufficient energy for commutation. With the appropriate capacitors suitably charged, the correct one of the GTO switches can be actuated to provide a commutation pulse. Referring still to FIG. 1, one embodiment of a control circuit which is capable of actuating the active elements of the inverter will now be described. However, it should be understood that in the normal situation, a control system for a conventional power inverter would be much more complex than herein illustrated so that a number of the output waveform parameters, such as phase angle, voltage magnitude, etc. of the output power can be varied. However, in that the reasons and the considerations for using different switching waveforms for the main thyristors are generally known to those of ordinary skill, and play no part in the present invention, a description of the advantages and disadvantages of any one switching waveform has not been presented herewith. A control waveform generator 60 creates at least one switching waveform pattern which is, in essence, a preselected pattern related to the desired fundamental frequency and harmonic content of the output waveform. The output of the waveform generator 60 is connected to a gating sequencer 62. The gating sequencer 62 merely forms a number of individual switching signals from the main switching pattern supplied by the waveform generator 60, each of these individual signals being matched to the particular characteristics of each of the thyristors used in the inverter. One such waveform is presented via the line 64 through the gate amplifier 66 to the control terminal of the main thyristor 16 while another waveform is presented via the line 68 and the gating amplifier 70 to the control terminal of the thyristor 14. The gating amplifiers 66 and 70 have an output signal suitable for driving the main thyristors. The gating sequencer 62 also provides switching signal waveforms which are matched to the GTOs 46 and 48 and transition them at the appropriate time in the switching sequence.

In order to determine the direction and magnitude of the load current at any given instant, a current detector 80 is positioned between the output node 26 and the load 40 in line 37. In response to a positive current, the current detector 80 provides a signal proportional thereto via line 82 to a positive level comparator 84. In a similar manner, negative current flow causes the current detector 80 to present a signal proportional thereto via a line 86 to a negative level comparator 88. By a comparison of the direction of current flow with the thyristor switching pattern, a determination of whether or not commutation is required can be made, the logic circuitry performing this function will be described in greater detail hereinafter.

A further feature of the present invention is that the commutation capacitors are returned to a stable voltage level at the end of the commutation period. This is accomplished by sensing the voltage level across the commutation capacitors and then switching the appropriate GTO off at the right moment. A comparator circuit 90 whose inputs are connected between the negative input bus 10 by line 92, the node 50 by line 94, and the positive input bus 12 by line 96 senses the voltage across the capacitor 42 while a comparator 98 is connected to the same three lines to sense the voltage across the capacitor 44. Each of the two comparator circuits compares the instantaneous voltage across its respective capacitor with the overall source input voltage level E in, and provides an output signal when that voltage reaches a preselected level of approximately E in/2.

As briefly described herebefore, a particular feature of the selective commutation circuit of the present invention is that the conducting state of the main thyristors in the bridge and the direction and magnitude of the current flow to the load is determined, and this information is then used to decide if the main thyristors can be turned off by merely removing their gate signal or whether the commutation circuit will be required to cause the conducting main thyristor to transition to its nonconducting state. For the purposes of explanation, a simple dedicated logic circuit is shown in FIG. 1 for performing this decision-making procedure, and its operation will be described in conjunction with that of the illustrated inverter. However, it should be understood that numerous other logic circuit configurations could be used for this decision-making procedure, including a suitably programmed microprocessor, or equivalent. Referring additionally to FIG. 2, there is seen a number of waveforms depicting the operation of an inverter employing the selective commutation technique according to the present invention. Waveform 100, seen in illustration (a) of FIG. 2 is a typical switching waveform and is presented by the switching waveform generator 60 to the gating sequencer 62. In a manner well known to those of ordinary skill, the gating sequencer 62 through the gate drivers 66 and 70 render the main thyristors 14 and 16 alternatively conductive near the transition points in the switching waveform pattern such that the positive input bus 12 and the negative input bus 10 are alternatively connected through the output node 26 to the load 40. This causes an alternating current between the inverter and the load, and the waveform 102 depicts one of the many possible current waveforms, without harmonics that could exist, this particular waveform illustrating a near unity power factor condition. As is well known, the precise phase relationship between the voltage and current waveforms at the inverter output would most likely vary continuously and is primarily related to the reactive component of the load impedance.

The decision-making logic employed in the selective commutation circuit according to the present invention includes an AND gate 110 whose output is coupled to the ON terminal of the gate drive 51, and also an AND gate 112 whose output is connected to the OFF terminal of the gate drive 51. In a similar fashion, an AND gate 114 has its output connected to the ON terminal of the gate drive 52 while the output of the AND gate 116 is connected to the OFF terminal of the gate drive 52. The gating sequence generator 62 presents a digital signal via the line 118 to the AND gate 110 to clock the turn-on points in the control waveform associated with the GTO 46. Similarly, the gating sequencer 62 presents a digital signal via the line 120 to one input of the AND gate 112 to clock the turn-off points for the GTO 46 in the switching pattern waveform. The turn-on points in the switching pattern for the GTO 48 are clocked via the line 122 to one input of the AND gate 114 while the turn-off transistors are digitally presented to an input of the AND gate 116 via line 124. The AND gate 112 has one input connected via line 126 to comparator 98 while AND gate 116 has one input coupled via line 128 to comparator 90 for receiving a digital indication of the voltage level across the commutation capacitors. A one shot 150 responds to a turn-on signal to the gate drive 51 and presents an enable signal to the gate drive 52 while a one shot 151 responds to a turn-on signal to the gate drive 52 and presents an enable signal to the gate drive 51. Both one shots 150 and 151 have a natural period of $\tau$ and provide an output signal at the trailing edge of the period. A simple digital logic circuit determines whether or not there is current flowing through the main thyristor 16 when it is in its conducting state. The positive comparator 84 provides a digital output signal indicating a positive current to the load, this signal delayed by a period $\tau$ in the delay unit 130, is presented via line 132 to one input of an AND gate 134. The other input of the AND gate 134 is connected by line 136 to the gating sequence generator 62 for receiving the gating signal waveform of the main thyristor 16 which indicates, in essence, that the thyristor is turned on during a particular period so that load current may flow therethrough. When both conditions exist, a load is flowing through the main thyristor 16 and the AND gate 134 presents a signal indicating such to one terminal of the AND gate 110 via the line 135. Accordingly, AND 110 can be enabled to actuate the gate drive 51 with the arrival of the switching point signal from the gate sequencer 62.

In a similar fashion, the determination as to whether or not current is flowing through the thyristor 14 is made by a digital signal from the negative comparator 88, delayed by a period $\tau$ in the delay unit 140. This signal is presented to one input of the AND gate 142 while the other input of the AND gate receives a signal from the gating sequencer 62 via the line 144 indicating whether the main thyristor 14 has been gated to its ON state. The output of the AND gate 142 is presented on line 146 to one input of the AND gate 114 to indicate essentially when the load current is flowing through the main thyristor 14.

As indicated hereinbefore, the present invention senses when the phase relationship between the voltage waveform in the inverter and the waveform of the load current are such that the thyristor to be switched off can be transitioned to the nonconducting state by merely removing the gate signal. As is seen in FIG. 2, at time $t_0$ the load current, waveform 102, is flowing in a negative direction or toward the output node 26 from the load 40. The thyristor 16 at this time is in its conducting state due to the presentation to its control terminal of the gating signal related to waveform 103, illustration (b) of FIG. 2. The auxiliary capacitors 42 and 44 are at a voltage level of $+(E\ in)/2$ and a signal indicating the same is presented by the comparators 90 and 92 to the AND gates 116 and 112.

At time $t_1-\tau$, it will be observed that the instantaneous value of current is still in the negative direction and thus the current is still flowing through the pathway which includes diode 39, and not through the main thyristor 16, even though it is in its conducting state. The AND gate 134 is inhibited, as is the AND gate 110, preventing a digital turn on signal from reaching the gate drive 51 so that the commutation circuit will not be actuated at this particular switching point $t_1$, this being shown in illustration (d) and illustration (e) of FIG. 2.

According to a particular feature of the present invention, the commutation capacitors are maintained at a stable voltage level, $+(E\ in)/2$, until they are required for commutation. If at any switching point, as dictated by the switching waveform out of the waveform generator 60, the conducting thyristor requires the assistance of a commutation pulse for transition to the nonconducting state, the auxiliary capacitors are suitably charged by a make up pulse prior to the switching point so that they can provide the required commutation pulse. Referring still to FIG. 2 in addition to FIG. 1, the conditioning of the commutation capacitors will now be described at one of the transitions which require the actuation of the auxiliary commutation circuit, $t_6$. As is seen in illustration (a) of FIG. 2, just prior to $t_6$ the current is positive, or flowing out of the output node 26 toward the load 40, and this current is being supplied through the pathway including the thyristor 16 which is in its conducting state. The digital signal indicating the positive current from the positive comparator 84 and the gating signal to the thyristor 16 enable the AND gate 134, which is so presented to one input of the AND gate 110. The other input of the AND gate 110 is supplied with the transition signal from the gating sequencer 62 enabling both the AND gate 110 and the gate drive 51 (waveform 105 in illustration (d)), which causes the GTO 46 to immediately turn on. The commutation capacitor 44, initially at a level of $+(E\ in)/2$, (waveform 108 of illustration (g)), discharges through the conducting thyristor 16 and the GTO 46, where it rerings on itself to a voltage level of $-(E\ in)/2$. Similarly, capacitor 42, also initially at a level of $+(E\ in)/2$ (waveform 107 of illustration (f)), charges to a voltage level of $+(3E\ in)/2$, so that by time $t_6$ the capacitors have sufficient energy stored thereon to commutate the load current flowing through the main thyristor 16. Simultaneously, the digital signals out of the comparators 90 and 92 change as the capacitors 42 and 44 shift from their stable voltage levels of $+(E\ in)/2$ toward the commutation levels. At time $t_6$ the commutation capacitors 42 and 44 have been suitably charged for commutation and the one shot 150, which has a natural period of $\tau$ and supplies an output at its trailing edge, provides a signal to the ON terminal of the gate drive 52 to trigger the GTO 48 into its conducting state. A commutation pulse 109, seen in illustration (h) of FIG. 2, flows toward the output node 26 displacing the current through the main thyristor 16 to the load 40. Since the enable signal has been removed from the gate terminal of the thyristor 16 by the gate sequencer 62, the main thyristor 16 changes to its nonconducting state.

A particular feature of the present invention is that after commutation the auxiliary capacitors are returned to their stable voltage levels of $+(E\ in)/2$ so that they can be suitably charged from that potential just prior to the next required commutation in the manner heretofore described. It should be noted that in conjunction with the commutation just described at $t_6$, if the GTO 48 were to remain in a conducting state after the main thyristor 14 were on, a pathway would be formed which would discharge the capacitor 42 below its stable level of $+(E\ in)/2$. Accordingly, the control circuitry of the present invention transitions the GTO 48 to its nonconducting state at the stable potential level to ensure that the capacitor 42 does not discharge below its stable levels. As the voltage level across the capacitors 42 and 44 reach their stable level of $+(E\ in)/2$ at about time $t_6+\tau$, the AND gate 116 receives a signal on one input via the line 124 to switch the GTO 48 to its nonconducting state. However, if the capacitor 42 has not returned to its stable level of $+(E\ in)/2$, the comparator 90 will not indicate the same and the AND does not enable until the voltage level on the capacitor 42 has reached its stable level. Subsequently, as the capacitor 42 reaches its stable level, the AND gate 116 is enabled and the gate drive 52 pulses the GTO 48 off.

In addition it should be understood that there are a multitude of switching patterns that might be employed in conjunction with the teaching and concept of the present invention and that the number of actuations selectively eliminated will be dependent upon the precise phase relationship between the voltage and current waveforms. For example, the specific switching pattern illustrated in FIG. 2 by waveform 100 is a 180° Hertz switching pattern in which there are six transitions per cycle. If each transition were to include actuation of the commutation circuit, there would be twelve commutation related pulses circulating within the inverter, six make up pulses and six commutation pulses, which reduce overall inverter efficiency. For the switching and current waveforms shown, it is possible to eliminate eight of the twelve pulses employing the concept and technique of the present invention. In view of the fact that the phase relationship in FIG. 2 is depicted near unity power factor, the exact number of pulses saved per cycle of load current will be dependent upon the power factor as determined by the load and the switching pattern.

Although the invention has been shown and described with respect to the preferred embodiment thereof, it should be understood by those skilled in the art that various changes and omissions in the form and detail thereof may be made without departing from the spirit and scope of the invention.

Having thus described typical embodiments of my invention, that which I claim as new and desire to secure by Letters Patent of the United States is:

1. An inverter having a pair of input buses on which electrical energy is received from a DC source for transformation to alternating electrical energy at an output node, comprising:
   main switch means responsive to a control waveform for alternatively connecting each input bus to said output node, said switch means not translatable to the nonconducting state unless there is a minimal current therethrough;
   commutation means for storing electrical energy and for providing a pulse of energy to said output node, if required, in response to said control waveform so that said switch means can transition to the nonconducting state; and
   means for sensing current flow through said main switch means, and for actuating said commutation means only in the event that said semiconductor switch means has more than a minimal current therethrough.

2. An inverter according to claim 1, wherein one of said input buses receives negative electrical energy and the other of said input buses receives positive electrical energy, and wherein said switch means includes a pair of main power thyristors, each connected between said output node and one of said input buses, and wherein said control waveform for alternatively connecting said negative and positive input buses to said output node is a preselected waveform from a waveform generator, and wherein said commutation means includes a commutation switch means which can be enabled by said control waveform from said waveform generator.

3. An inverter according to claim 2, further including a logic circuit including a current detector means disposed to sense the direction of current flow from said inverter and for preventing said control waveform from said waveform generator from actuating said commutation switch means in the event that no load current is flowing through said main switch means when said main switch means are to be transitioned to the nonconducting state in accordance with said control waveform.

4. An inverter according to claim 1, wherein said commutation means includes a pair of commutation capacitors connected across said input buses, the potential on said pair of capacitors being maintained at a stable level during the operation of the inverter, and wherein said pair of capacitors are charged to a level suitable for commutating said main switch means, if required, just prior to a commutation point, and wherein said pair of capacitors are returned to said stable voltage level after the commutation point.

5. An inverter according to claim 1, wherein said commutation means further includes a pair of unidirectional switches connected in a back-to-back configuration between said pair of commutation capacitors and said output node, and wherein a comparator means is provided to sense the voltage across said pair of commutation capacitors, and to cause said unidirectional switches to turn off at the end of the commutation period so that said pair of commutation capacitors are returned to their stable voltage level.

6. An inverter according to claim 1, wherein said commutation means includes a pair of commutation capacitors on which a make up pulse causes energy to be stored thereon for commuation, and wherein said pair of commutation capacitors are discharged in accordance with said control waveform to create a commutation pulse which allows said main switch means to transition to the nonconducting state.

7. An inverter according to claim 6, wherein said commutation means further includes a pair of commutation switches connected between said pair of commutation capacitors and said output node, and wherein commutation, if required, of said main switch means in accordance with said control waveform results in one of said commutation switches being activated just prior to the commutation period creating said make up pulse for charging said pair of commutation capacitors, and wherein said other of said commutation switches is enabled at the commutation point to create a commutation pulse allowing said main switch means to transition to the nonconducting state.

* * * * *

UNITED STATES PATENT AND TRADEMARK OFFICE
CERTIFICATE OF CORRECTION

PATENT NO. : 4,255,783
DATED : March 10, 1981
INVENTOR(S) : GORDON J. MESSER

It is certified that error appears in the above—identified patent and that said Letters Patent is hereby corrected as shown below:

Column 6, line 29, "transistors" should read -- transitions --

Signed and Sealed this

Eleventh Day of August 1981

[SEAL]

Attest:

Attesting Officer

GERALD J. MOSSINGHOFF

Commissioner of Patents and Trademarks